Jan. 3, 1956    M. CLAPP    2,728,945
TIRE CURING ARRANGEMENT
Filed Dec. 2, 1952    2 Sheets-Sheet 1

MAURICE CLAPP
INVENTOR.

BY
ATTORNEYS

Jan. 3, 1956  M. CLAPP  2,728,945
TIRE CURING ARRANGEMENT
Filed Dec. 2, 1952  2 Sheets-Sheet 2

MAURICE CLAPP
INVENTOR.

BY *Lyon & Lyon*
ATTORNEYS

United States Patent Office 2,728,945
Patented Jan. 3, 1956

2,728,945

TIRE CURING ARRANGEMENT

Maurice Clapp, Redlands, Calif.

Application December 2, 1952, Serial No. 323,605

9 Claims. (Cl. 18—18)

The present invention relates to a structure useful in curing tires.

In curing or retreading the new so-called "low-pressure" tires, some difficulty has been encountered in centering the new tread on the carcass, due to the fact that the side walls of the tires are more bulbous and no precise control is exercised over the positioning of the beads of the tire during the tire curing process. While the present invention is described specifically in relationship to curing low pressure tires, it will be evident that the use of the invention is not limited and that it may be used in connection with other tires.

Briefly, the present invention contemplates a structure wherein the spaced beads of a tire are engaged and secured in position preparatory to the tire curing or retreading operation.

An object of the present invention therefore is to provide an improved structure for obviating the above-mentioned difficulties.

A specific object of the present invention is to provide a structure which positively engages and maintains the spaced beads of an automobile tire in predetermined position so that the treads may be accurately centered with respect to the beads.

Another specific object of the present invention is to provide a structure of this character which is relatively simple and inexpensive and rugged.

Another specific object of the present invention is to provide an improved apparatus of this character which is easy to use.

Another specific object of the present invention is to provide apparatus of this character which incorporates novel locking and clamping means.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
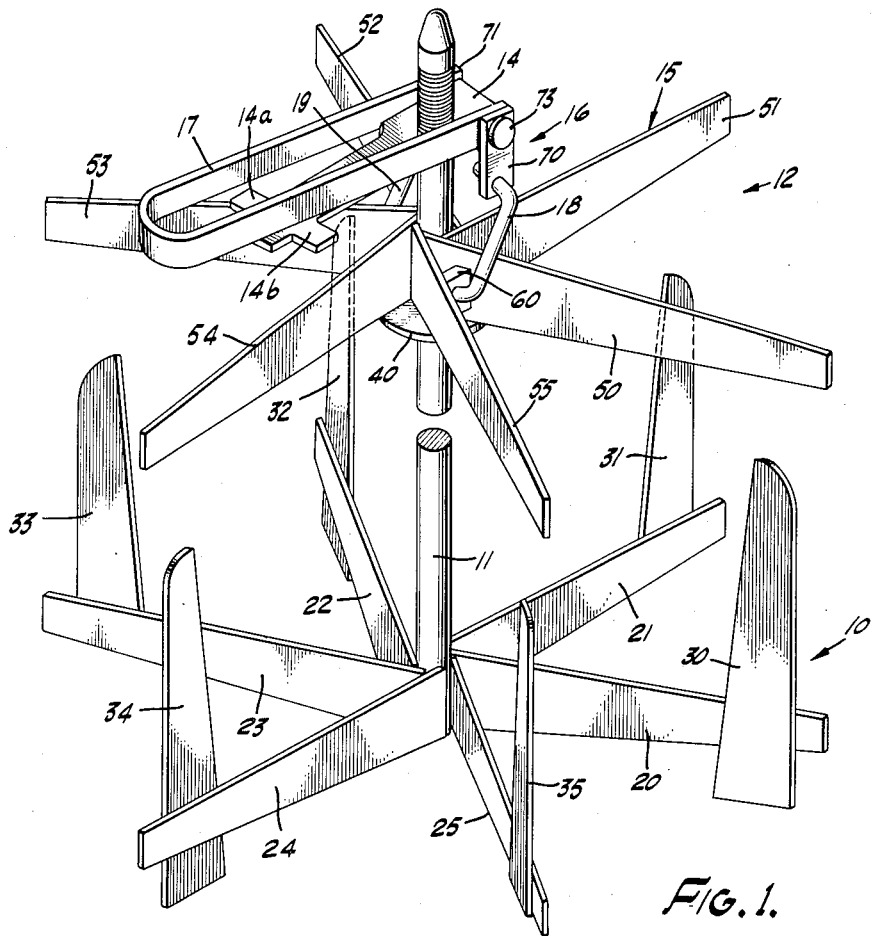
Figure 1 is a perspective view of the apparatus embodying the features of the present invention, the apparatus being shown in its locked or clamped position.
Figure 3:
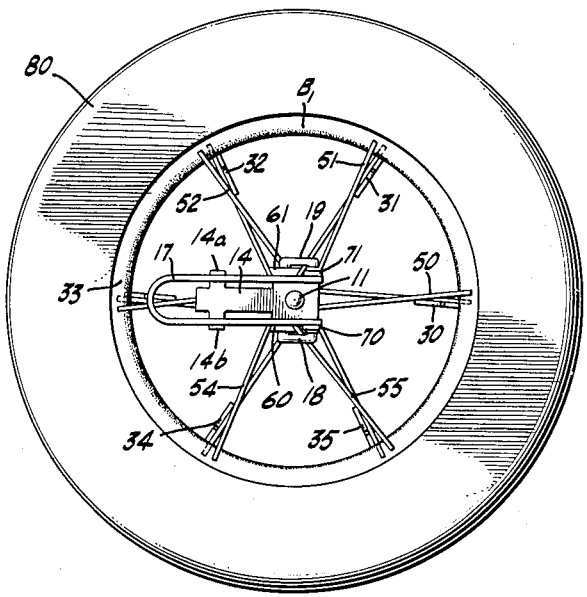
Figure 3 is a view taken substantially in the direction of the arrows 3—3 in Figure 2.
Figure 2:
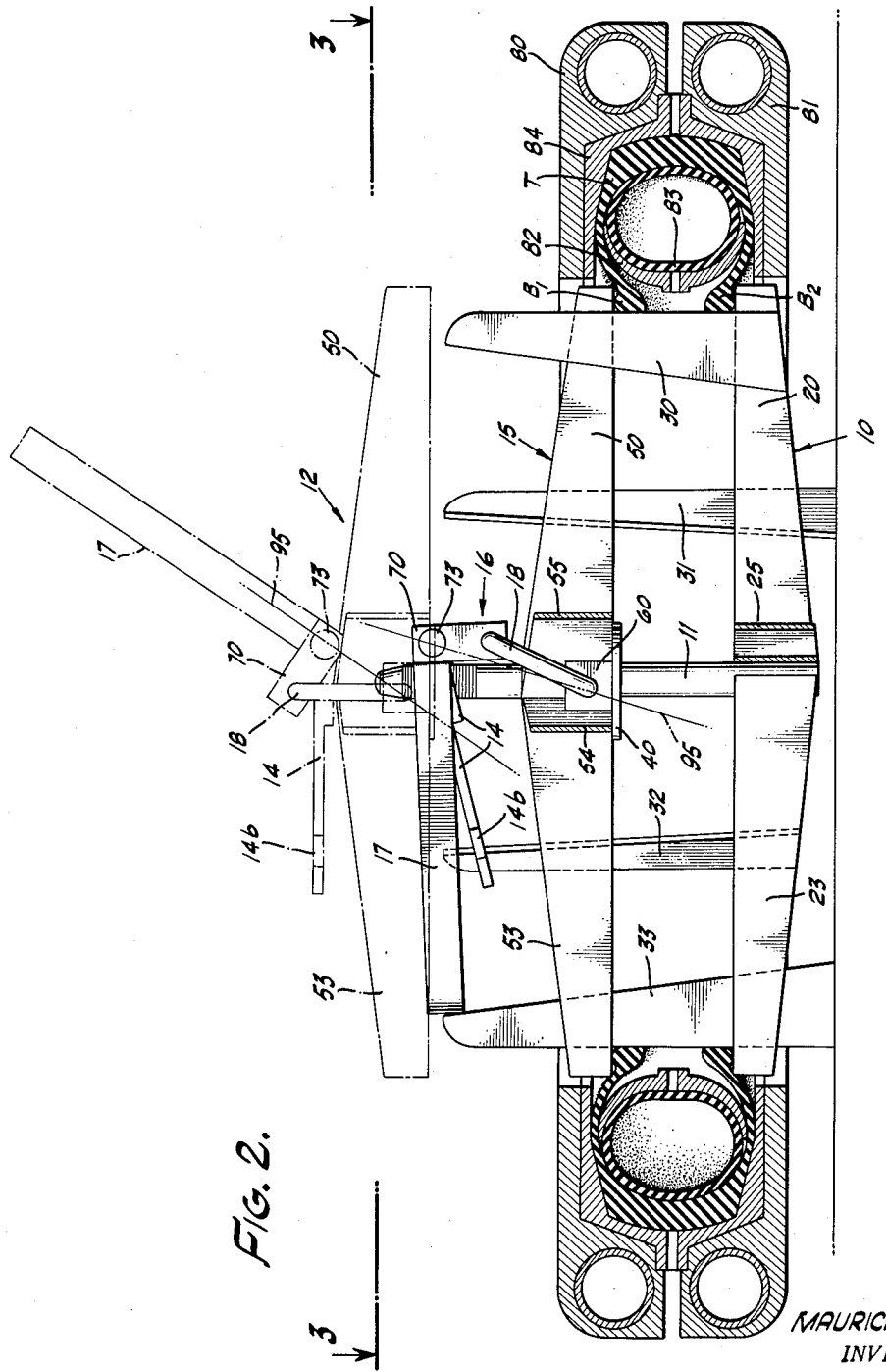
Figure 2 shows the apparatus of Figure 1 applied to a tire and a tire curing structure.

The apparatus embodying the features of the present invention is shown in Figure 1 and it is optional whether the apparatus is separate, as shown in Figure 1, or whether the base member 10 is permanently affixed to a tire curing structure of the character illustrated in Figure 2.

The structure shown in Figure 1 incorporates generally a base member 10 having a centrally disposed rod 11, a clamping member 12 which is slidably mounted on the rod or post 11. The clamping member 12 incorporates locking means which includes a friction plate 14 and a tire bead engaging element 15, the element 15 comprising, in fact, six radially spaced arms which may be maintained in a pressure applied position by an over-centering mechanism 16, said over-centering mechanism 16 including the handle 17 and pivoted link or toggle members 18, 19.

Describing the base 10 specifically, the base 10 includes a plurality of, i. e. six, circumferentially spaced bead engaging fingers 20, 21, 22, 23, 24, and 25, which are mounted on the rod or post 11 so as to extend radially outwardly therefrom. A plurality of, i. e. six, tire bead bridging members 30, 31, 32, 33, 34, and 35 are mounted on a corresponding one of said fingers 20—25, respectively, with the outer edges of such bridging members extending generally parallel with the axis of the central rod or post 11.

The clamping member 12 includes a disk 40 which is slidably mounted on the post 11 and which has welded thereto a plurality of, i. e. six, circumferentially spaced bead engaging fingers 50, 51, 52, 53, 54, and 55. Also secured to the disk 40 are a pair of oppositely disposed bearing blocks 60, 61 in which one end of toggles or links 18, 19 is journaled. The other end of each of the toggles or links 18, 19 is journaled in downwardly extending arms 70, 71, respectively, the arms 70, 71 being secured to the U-shaped handle 17. A pivot pin 73 passes through the free ends of the U-shaped handle 17 for rotatably supporting the friction plate 14 which has an apertured portion slightly larger than the diameter of the rod or post 11 for purposes of securing a locking or binding action therewith.

As mentioned previously, the base 10 may be integrally formed with or affixed to a tire curing structure of the character shown in Figure 2. Such tire curing structure includes conventional elements, namely a conventional mold including the steam-heated jackets 80, 81, rim 82, air bag 83 and liner 84. The automobile tire T having conventional beads $B_1$, $B_2$ is disposed generally between the air bag 83 and liner 84. The circle defined by the outer edges of the vertically extending bead bridging members 30—35, respectively, has a diameter substantially equal to the bead diameter of the tire so that the tire may be slipped over the same and, to facilitate this operation, the upper ends of the members 30—35, both inclusive, are chamfered or rounded off, as shown. It is noted that the outer ends of the fingers 20—25 extend beyond the bead bridging members 30—35, both inclusive, a slight distance substantially equal to the radial width of the bead so that they conveniently engage the same. The same is true of the fingers 50—55, which are of lengths substantially equal to the lengths of the fingers 20—25, both inclusive, so that such fingers 20—25 on the one hand, and 50—55 on the other hand, may engage opposite ones of the beads $B_2$, $B_1$, respectively, and sandwich the same therebetween. As a matter of fact, the beads $B_1$, $B_2$, in operation of the device as described hereinafter, are automatically moved towards each other and maintained under pressure by the clamping and locking structure described above.

In operation, the clamping member 12 is first removed from the post 11 and the tire is slipped over the fingers 30—35 both inclusive to a point where the beads $B_2$ rest on the fingers 20—25, both inclusive. Then, the clamping member 12 is slid over the post 11 to a point where the fingers 50—55 thereof engage the upper beads $B_1$. The handle 17 is then moved downwardly towards the base and, in such case, the friction plate 14 binds on the post 11 to lock such friction plate 14 to the post 11. Further movement of the free end of the handle 17 results in the application of a thrust to the links 18, 19 and this thrust, of course, is transmitted to the clamping structure 12 to thereby move the bead $B_1$ closer to the bead $B_2$. During the application of such thrust forces to the links 18, 19, they pivot from a position indicated in dotted lines in Figure 2 to the full line position shown in Figure 2, i. e. to an over-centered position wherein it is maintained even though the manual effort applied to the handle 17 is released. With reference to such over-centered position, it is observed that, initially, the upper end of the toggles or links 18, 19 is to the left of the line 95 which passes through the axis of the pivot pin 73 and through the pivoting axis of the lower end of such links 18, 19; and, subsequently, in the locked position, the end of the links 18, 19 is to the right of such line 95. In other words, the links 18, 19 are moved through an over-center position and, to release the clamping forces on the beads, it is necessary to subsequently move the free end of the handle 17 upwardly.

While Figure 2 shows the beads $B_1$, $B_2$ of the tire spaced a relatively large distance apart because of the character of the tire T, such beads in other tires are moved much closer together and, as a matter of fact, may actually abut one another.

A feature of this arrangement is that application of the same results in equalization of stresses in the tire in that substantially equal forces are applied in such direction as to cause the tire T to be bent around the upper cores of the rim 82 and, in the case of a tire which has its beads abutting, the tire is very accurately centered with reference to the mold structure since three points are defined, namely, first, the point at which the beads abut and, secondly and thirdly, the peripheral ends of the rim 82 so that, in effect, the tire is centered with respect to a triangle which is accurately defined.

It is observed that the apparatus is not applied at any time during which the air bag 83 in inflated. In other words, after the tire is centered in the mold structure, the bead clamping structure is released and the air bag 83 is inflated.

It is noted that there are actually twelve points of contact, counting the contact points on both beads, and that these contact points may be circumferentially spaced 30 degrees apart. Since the fingers 20—25 and 50—55 are of metal approximately 1/8 inch thick, the contact area is relatively small and thus the frictional resistance is relatively small, thus facilitating the application and removal of the device from the tire.

A feature considered important in the present invention is the provision of the bead bridging members 30—35, both inclusive, which have perpendicularly extending contact edges which serve as a guide for continuous movement of the beads from their furthermost apart position to their closest position thereby clearly defining the path of movement of the beads and assuring the proper equal radial displacement of each bead. Also of importance is the fact that movement of the beads is piloted from one side, i. e. movement of the beads is accomplished upon movement of only one of the group of bead clamping fingers, namely the bead clamping fingers 50—55, both inclusive, for all intents and purposes, the other base bead engaging fingers 20—25, both inclusive, being relatively stationary.

It has been observed in practice that, when used by inexperienced personnel, there is some danger that the toggle links 18, 19 may be bent upon application of too great a force to the free end of the handle 17. In order to prevent this undesirable condition from existing, the friction plate 14 has its free end of larger cross-section than the cross-section of the U-shaped handle 17, so that the friction plate 14 abuts the handle 17 in the locked position of the handle 17, so that any excessive force is transmitted to the friction plate 14 and hence to the post 11 instead of to the toggle links 18, 19. For this purpose, the friction plate 14 has a pair of outwardly extending ears 14A, 14B, which serve as stop members.

Further, to prevent slippage of the friction plate 14 on the post 11, the post 11 is roughened as for example by providing annular or circular grooves therein.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A tire engaging structure comprising a base member having: a centrally disposed post, a plurality of circumferentially spaced tire bead engaging fingers mounted on said post and extending radially outwardly therefrom, a plurality of tire bead bridging members, one of which is mounted on a corresponding finger and extends generally parallel with the axis of said post; a tire clamping member normally slidably mounted with respect to said base member, said clamping member being slidably mounted on said post; a handle; a friction plate pivoted on said handle about a first pivoting axis, said friction plate having a friction aperture engaging said post; and a toggle having its upper end pivoted on said handle about a second pivoting axis and the lower one of its ends pivoted on said clamping member and having one end thereof movable past a line joining said first and second pivoting axes.

2. A tire engaging structure comprising a base member having: a centrally disposed post, a plurality of circumferentially spaced tire bead engaging fingers engageable only with the bead of a tire and mounted on said post and extending radially outwardly therefrom, a plurality of tire bead bridging members engageable only with said tire bead, one of which is mounted on a corresponding finger and extends generally parallel with the axis of said post; a tire clamping member normally slidably mounted on said base member, said clamping member being slidably mounted on said post; a handle; locking means slidably mounted on said post and operated by said handle for locking said clamping member on said post.

3. A tire engaging structure comprising a base member having: a centrally disposed post, a plurality of circumferentially spaced tire bead engaging fingers engageable with a tire bead and mounted on said post and extending radially outwardly therefrom, a plurality of tire bead bridging members engageable only with a tire bead, one of which is mounted on a corresponding finger and extends generally parallel with the axis of said post; a tire clamping member normally slidably mounted on said post and locking means mounted on said tire clamping member for locking said clamping member on said post.

4. The arrangement set forth in claim 1 in which said friction plate is provided with an extension in the path of movement of said handle for limiting movement of said handle when said friction plate is locked to said post.

5. A tire engaging structure comprising a base member having: a centrally disposed post, a plurality of circumferentially spaced tire bead engaging fingers mounted on said post and extending radially outwardly therefrom, a plurality of tire bead bridging members, one of which is mounted on a corresponding finger and extends generally parallel with the axis of said post; a tire clamping member normally slidably mounted with respect to said post member, said clamping member being slidably mounted on said post; a handle; a friction plate pivoted on said handle, said friction plate having a friction aperture for locking said friction plate to said post, cooperating stop means between said handle and said friction plate for limiting movement of said handle when said friction plate is locked to said post; and an over-center toggle link connecting said handle to said clamping member.

6. A tire engaging structure comprising a base member having: a centrally disposed post, tire bead engaging means mounted on said post, tire bridging means mounted on said base and extending generally parallel with the axis of said post; a tire clamping member normally slidably mounted with respect to said base member, said clamping member being slidably mounted on said post; a handle; a friction plate pivoted on said handle and having a friction aperture engaging said post for locking said friction plate to said post; and over-center toggle means connecting said handle to said tire clamping member.

7. A tire alignment structure of the character described comprising a pair of relatively movable members, each of said members having a central portion from which there extends radially a plurality of arms each arranged to make substantially a line contact with corresponding opposite sides of a tire bead, said arms being engageable only with said tire bead, one of said members having a plurality of tire bead bridging members mounted on a corresponding arm and extending generally at right angles to the axis of the corresponding arm upon which the bridging member is mounted, said tire bridging member being engageable only with said tire bead, and means interconnecting said two members for allowing one of said members to be adjusted with respect to the other.

8. A tire alignment device of the character described comprising a base member having a centrally disposed post, a plurality of circumferentially spaced tire bead engaging fingers mounted on said post and extending radially outwardly therefrom, a plurality of tire bridging members, one of which is mounted on a corresponding finger and extends generally parallel with the axis of said post; said fingers and bridging members being arranged to contact only the bead of a tire on substantially line contacts, a tire clamping member normally slidably mounted with respect to said base member, said clamping member having a plurality of fingers extending outwardly therefrom and engageable only with said tire bead on substantially line contacts, said clamping members being slidably mounted on said post, and means for locking said clamping member with respect to said post.

9. A tire alignment device comprising a first member having a plurality of circumferentially spaced tire bead engaging fingers extending radially outwardly therefrom, a plurality of tire bead bridging members, one of which is mounted on a corresponding finger and extends generally perpendicularly with respect to the axis of the corresponding finger; a second member having a plurality of circumferentially spaced tire bead engaging fingers extending radially outwardly therefrom and engageable with that side of the tire bead opposite to that side engaged by the first mentioned fingers, each of said fingers and bridging members being arranged to contact only said tire bead, means interconnecting each of the two members for adjusted movement with respect to each other.

References Cited in the file of this patent

UNITED STATES PATENTS 2,227,798 Rihn et al. _____ Jan. 7, 1941